(12) United States Patent
Blum (10) Patent No.: US 8,411,325 B2
(45) Date of Patent: Apr. 2, 2013

(54) METHOD FOR SCREENING COLOR SEPARATIONS OF A LENTICULAR IMAGE, COMPUTER PROGRAM PRODUCT AND METHOD FOR PRODUCING A LENTICULAR IMAGE ON A PRINTING MATERIAL

(75) Inventor: Dietrich Blum, Kiel (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 559 days.

(21) Appl. No.: 12/732,407

(22) Filed: Mar. 26, 2010

(65) Prior Publication Data

US 2010/0245926 A1  Sep. 30, 2010

(30) Foreign Application Priority Data

Mar. 26, 2009  (DE) .................. 10 2009 015 268

(51) Int. Cl.
*G06K 9/36* (2006.01)
*G06K 9/32* (2006.01)
*G06K 1/405* (2006.01)
*H04N 13/00* (2006.01)
*H04N 13/04* (2006.01)
*H04N 1/46* (2006.01)
*G06F 3/12* (2006.01)
*H04F 3/12* (2006.01)

(52) U.S. Cl. ...... 358/3.06; 358/1.9; 358/3.13; 358/3.14; 358/536; 348/42; 348/43; 348/51; 382/285; 382/296

(58) Field of Classification Search .............. 358/1.9, 358/3.13, 3.14, 536; 348/42, 43, 51; 382/285, 382/296

See application file for complete search history.

(56) References Cited

U.S. PATENT DOCUMENTS

| | | | |
|---|---|---|---|
| 5,519,794 A | | 5/1996 | Sandor et al. |
| 6,687,021 B1* | | 2/2004 | Kerz .................. 358/1.9 |
| 6,853,467 B2* | | 2/2005 | Wadle et al. ........... 358/1.9 |
| 7,505,177 B2 | | 3/2009 | Wechgeln et al. |
| 7,515,303 B2 | | 4/2009 | Hansel et al. |
| 2009/0284798 A1* | | 11/2009 | Blum .................. 358/3.06 |

FOREIGN PATENT DOCUMENTS

| | | |
|---|---|---|
| DE | 100 22 225 A1 | 11/2001 |
| DE | 10 2007 054 011 A1 | 5/2009 |
| DE | 10 2009 018 284 A1 | 11/2009 |
| JP | 2000-105559 A | 4/2000 |

OTHER PUBLICATIONS

German Patent and Trademark Office Search Report, dated Jan. 12, 2010.

* cited by examiner

*Primary Examiner* — Akwasi M Sarpong
(74) *Attorney, Agent, or Firm* — Laurence A. Greenberg; Werner H. Stemer; Ralph E. Locher (57) ABSTRACT

A method for screening color separations of a lenticular image having a lenticular frequency of lenticular lenses for viewing the image, with a lens width l. An amplitude-modulated halftone image is calculated for each color separation at one screen angle with a rational number tangent and screen frequency. The screen has non-orthogonal screen cells spanned by vectors u, v for a specific color separation. A distance k is defined. Directions of vectors u, v relating to perpendicular direction relative to image strips of the lenticular image are defined for the specific color separation. First (n, m) and second (i, j) pairs of rational numbers are defined, to satisfy a system of equations: $n^*u_x+m^*v_x=0$, $n^*u_y+m^*v_y=1$, $i^*u_x-j^*v_x=k$ and $i^*u_y-j^*v_y=0$ for vectors $u=(u_x, u_y)$ and $v=(v_x, v_y)$ spanning screen cells. A computer program product is also provided.

20 Claims, 9 Drawing Sheets

$n \cdot \vec{u} + m \cdot \vec{v} = \vec{l}$ $n \cdot u_x + m \cdot v_x = 0$ $n \cdot u_y + m \cdot v_y = \|l\|$

METHOD FOR SCREENING COLOR SEPARATIONS OF A LENTICULAR IMAGE, COMPUTER PROGRAM PRODUCT AND METHOD FOR PRODUCING A LENTICULAR IMAGE ON A PRINTING MATERIAL

CROSS-REFERENCE TO RELATED APPLICATION

This application claims the priority, under 35 U.S.C. §119, of German Patent Application DE 10 2009 015 268.7, filed Mar. 26, 2009; the prior application is herewith incorporated by reference in its entirety.

BACKGROUND OF THE INVENTION

Field of the Invention

The invention relates to a method for screening color separations of a lenticular image having a lenticular frequency of the lenticular lenses required for viewing the lenticular image, having a lens width l, in which an amplitude-modulated halftone image is calculated for each of the color separations at least at one screen angle with a tangent which is a rational number and with at least one screen frequency, and the screen has non-orthogonal screen cells spanned by vectors u and v for at least one specific color separation from among the color separations. The invention furthermore relates to a computer program product for executing the method and a method for producing a lenticular image on a printing material.

In high-quality printing of packaging, it is increasingly desired to achieve particular effects for the human eye in order to increase the attractiveness of the printed packaging and thus of the product contained therein. The production of lenticular images, in particular, is widely used for that purpose. The lenticular images are composed of an ordered sequence—coordinated with a lenticular frequency—of a plurality of images which are decomposed into strips and which are viewed through a group of lens strips of corresponding lenticular frequency (in lenses per unit length) which are oriented in the direction of the image strips. Depending on the viewing angle, the individual strips of the ordered sequence which are imaged through the lenses in that viewing direction form a composite overall image. Different overall images can be visible at different viewing angles with appropriately chosen ordering of the strips of a plurality of images. In this way, as an example, an illusion of movement can be generated if a series of individual images of successive movement steps can be perceived progressively as a function of the viewing angle.

In most of the widespread printing methods, in particular for offset printing, it is necessary, for the realization of brightness differences, to generate an image which is screened into color dots and which brings about the desired brightness impression for the observer. Conventional methods use color dots which are disposed in a regular screen and the area sizes of which are varied (amplitude-modulated screens). In multicolor printing, in particular four-color printing, there is the risk, as is known, that, in the combination printing of screens of the plurality of color separations, optically visible and thus disturbing artifacts will arise if the halftone images of the individual color separations interfere with one another (e.g. Moiré effect).

It has emerged in practice that the fact that the lenticular image has a distinguished angular direction due to the direction of the disposed image strips and a lenticular frequency (in lenses per unit length)—a spatial frequency—represents an additional challenge in the production of screened lenticular images. A lenticular image has an additional periodicity in comparison with conventional images in one direction, which additional periodicity can interfere with those of the screens of the color separations, with the result that undesired visible artifacts occur. In particular, the lenticular frequency or a small multiple of the lenticular frequency and a screen frequency (in halftone dots per unit length, widely referred to as lines per inch) can be on the same order of magnitude. That has been remedied heretofore only through the use of screens having parameters which have been determined on the basis of empirical experiments. With the exception of the technical teaching of German Published, Non-Prosecuted Patent Application DE 10 2008 024 238 A1, corresponding to U.S. application Ser. No. 12/468,082, filed May 19, 2009, heretofore no method available to the public has existed in which a screen with adequate parameters is determined systematically.

SUMMARY OF THE INVENTION

It is accordingly an object of the invention to provide a method for screening color separations of a lenticular image, a computer program product and a method for producing a lenticular image on a printing material, which overcome the hereinafore-mentioned disadvantages of the heretofore-known methods and products of this general type and which enable screening of a lenticular image with a minimal Moiré effect. In particular, the intention is at the same time to minimize viewing angle dependence of color perception.

With the foregoing and other objects in view there is provided, in accordance with the invention, a method for screening color separations of a lenticular image having a lenticular frequency of lenticular lenses required for viewing the lenticular image, having a lens width l, in which an amplitude-modulated halftone image is calculated for each of the color separations at least at one screen angle, in particular one screen angle or two screen angles, (for a respective one of the color separations), having a tangent which is a rational number, and with at least one screen frequency, in particular one screen frequency or two screen frequencies, (for a respective one of the color separations) and, for at least one specific color separation from among the color separations, the screen has non-orthogonal screen cells spanned by (two linearly independent) vectors u and v. A distance k is defined. Those directions of the vectors u and v which relate to the perpendicular direction with respect to image strips of the lenticular image are defined for the specific color separation. A first pair of rational numbers (n, m) and a second pair of rational numbers (i, j) are defined, in such a way that for the vectors $u=(u_x, u_y)$ and $v=(v_x, v_y)$ spanning the screen cells, the system of equations:

$$n*u_x + m*v_x = 0,\ n*u_y + m*v_y = 1,\ i*u_x - j*v_x = k \text{ and } i*u_y - j*v_y = 0 \text{ is satisfied.}$$

The operator * denotes multiplication. The vectors u and v spanning a non-orthogonal screen define two screen angles for the non-orthogonal screen, while one characteristic screen angle can be determined for an orthogonal screen. The distance k is particularly preferably identical for all of the color separations. One, some or all of the numbers n, m, i and j are preferably integers, in particular a natural number. For a rational number n, m, i and j, it can hold true, in particular, that a small multiple of the rational number is an integer, or to put it another way that the denominator of the rational number is a small natural number. The respective tangent is preferably a rational number for all of the screen angles.

The invention thus purposefully provides a screening method which involves determining, for the printing of a lenticular image, expedient amplitude-modulated screens, in particular the screen angles thereof and the screen rulings thereof for the individual halftone images of the color separations. Each of the screens is oriented with respect to the direction of the lenticular image. As an advantageous consequence, no interaction of the screen with the lenticular frequency and the image content of the lenticular image that is disposed in ordered strips arises, in particular in combination printing of a plurality of color separations. In comparison with the technical teaching of German Published, Non-Prosecuted Patent Application DE 10 2008 024 238 A1, corresponding to U.S. application Ser. No. 12/468,082, filed May 19, 2009, which technical teaching is directed to orthogonal screens, the number of screens suitable for practical use is considerably increased. This holds true, in particular, for screens at higher lens frequencies greater than 100 lpi (lines per inch), in combination with conventional exposure device resolutions, for example 2400 dpi (dots per inch) or 2540 dpi.

Whereas, in accordance with the technical teaching of German Published, Non-Prosecuted Patent Application DE 10 2008 024 238 A1, corresponding to U.S. application Ser. No. 12/468,082, filed May 19, 2009, a square supercell always arises since the repetition periods perpendicularly to the lenses and in the direction toward the lenses are identical, the size of the supercell in the direction of the lenses can be chosen independently in the method according to the invention, in such a way that this additional degree of freedom can be utilized.

The first pair of rational numbers (n, m) and the second pair of rational numbers (i, j) are preferably defined purposefully with knowledge of the resolution of the exposure device used to record the halftone image on an image carrier, for example a printing form.

In a further development of this embodiment, a super-supercell can be defined, in which the integrality is provided only after a number w of repetitions of the supercell. As a result, it is not absolutely necessary to adapt the exposure device resolution to the lens width in such a way that a whole number of exposure device pixels lies under each lens. In other words, l can include a plurality of lenses.

The successful effect of the method according to the invention is based on the principle that all of the screens used for the individual color separations have the same period as the lenses in the direction perpendicularly to the lenticular lenses. In particular, they also have the same period in the direction parallel to the lenticular lenses. Furthermore, a virtually identical area coverage can be perceived from each viewing angle. This has the effect that, for each viewing angle, all of the lenses show the same excerpt from the screen. For the expert in the technical field described in the instant application, it is clear that the lenticular frequency is not constant over the lenticular image in practice, in such a way that a corresponding tolerance is permissible in practice, that is to say that even an approximate identity of the periods is sufficient without disturbing Moiré effects being able to occur. It has emerged after corresponding investigations that the tolerance which is still acceptable for the approximate identity is ±2 image lines, preferably ±1 image line, and therefore the fact that conventional raster image processors normally cannot generate angle and width combinations exactly, but rather only with a certain tolerance, is unimportant in practice.

Since only a screen excerpt enlarged in one dimension is ever visible to the observer of the lenticular image due to the lenticular lenses, rosette patterns such as are known from the combination printing of color separations in conventional screens are lost, for example. When viewed through the lenticular lenses, in each lens the observer always sees the corresponding excerpt of the screen. A Moiré effect between the lens and the screen is avoided in this way. In order to avoid a disturbing effect in the lens direction, the approach for minimizing Moiré periods that is known from RT screens is pursued.

The frequencies are spatial frequencies. The screen produced in the method according to the invention is a non-orthogonal screen, in particular. The method steps according to the invention can be employed for each of the color separations. The halftone dots can be circular, square, elliptical or linear, with elliptical dots, in particular with high eccentricity, and linear dots, being particularly preferred, in such a way that, in combination with suitable vectors, a viewing angle dependence can be reduced or minimized.

Preferably, in the method according to the invention, the screen angles for a respective two of the color separations are different from one another. In other words, for different color separations, halftone images are produced having screens which lie in a manner rotated relative to one another or at different angles with respect to the direction of the lenticular image. According to the invention, the screens can have screen rulings that are different from one another at different screen angles.

Furthermore, the screen angle for a specific color separation can be chosen from a group of screen angles which are optimized for minimizing Moiré effects in screenings. The screen angles can, for example, be the widely used angles of the screen having different screen angles which have a rational tangent and having screen angles which are optimized with regard to avoiding Moiré effects (RT screens).

In preferred embodiments of the method according to the invention, the distance k is substantially equal to the lens width l, in particular exactly equal to the lens width l. In particular, all of the screens can have the same supercell, k can be identical for all of the color separations, while l is identical for all of the color separations.

In a first exemplary embodiment of the method according to the invention, the screen angle is 0 degrees or 45 degrees or approximately 18.435 degrees (tangent equals ⅓) or approximately 161.565 degrees (tangent equals −⅓).

In a second preferred embodiment of the method according to the invention, the screen angle is approximately 33.69 degrees (tangent equals ⅔) or approximately 146.31 degrees (tangent equals −⅔) or approximately 18.435 degrees (tangent equals ⅓) or approximately 161.565 degrees (tangent equals −⅓).

In the method according to the invention for screening color separations of a lenticular image, in particular, four halftone images of four color separations can be calculated for four-color printing in cyan, magenta, yellow and black. For multicolor printing with a larger or a smaller number of colors, a corresponding number of halftone images of color separations can be calculated. In particular, it is possible to provide one or a plurality of the color separations for a special color which is not intended to be generated by mixing from the primary colors.

In the case of four color separations for combination printing in four-color printing (cyan, magenta, yellow, black), in the two preferred embodiments mentioned above, a respective screen angle is provided for a halftone image of a color separation, in which case, in general, the assignment of the colors is in any desired manner and can be chosen in accordance with the motif of the lenticular image or a different criterion for the purpose of optimizing the result.

In a particularly advantageous further development, the method according to the invention is developed further from the standpoint that the calculated non-orthogonal screen for a first color separation is combined with an orthogonal screen for a second color separation: in this further development of the method according to the invention, the screen angle (for a non-orthogonal screen of a specific color separation) is 0 degrees or 45 degrees. A third pair of integers (p, q) is determined for a further color separation, with the quotient (q/p) of those integers being equal to the tangent of the screen angle of the further color separation. The screen frequency of the further color separation is calculated as the product of the lenticular frequency and the square root of the sum of the squares of the two integers p and q. To put it another way, the determination of the orthogonal screen for the further color separation is effected in accordance with the technical teaching of German Published, Non-Prosecuted Patent Application DE 10 2008 024 238 A1, corresponding to U.S. application Ser. No. 12/468,082, filed May 19, 2009. The content of that patent application is explicitly incorporated by reference into the content of the disclosure of the present patent application. In concrete terms, the screen angle of the further color separation is preferably approximately 18.435 degrees (tangent equals ⅓) or approximately 161.565 degrees (tangent equals −⅓).

Applying the method according to the invention to screens below the angles 0 or 45 degrees is significant in so far as a high image angle dependence can occur in the case of orthogonal screens. Since the supercell determines the Moiré period in combination printing, the quality impression is particularly advantageously positive if the supercell is at least approximately square. A combination of square and non-square screen cells with good combination printing is possible particularly in the case of a square supercell. The square supercell is the most pleasant form for visual perception. In order to simplify the ability to realize the screens by raster image processors (RIPs), the corner points of the supercell should lie on whole coordinates of the coordinate system of the exposure device.

The lenticular frequency can be between 5 and 150 lpi (lines per inch), preferably between 15 and 120 lpi, in particular between 60 and 105 lpi. The lenticular frequencies 62, 75 and 100 lpi are used particularly often.

With the objects of the invention in view, there is also provided a computer program product, in particular a screen parameter calculation program and/or a raster image processor (RIP). The screen parameter calculation program can generate output data with which a raster image processor can be supplied. The raster image processor can process, in particular, input data to be screened in the Portable Data Format (PDF) or in PostScript (PS). The computer program product according to the invention can be loaded directly into the internal memory of a digital computer and/or be stored on a computer-suitable medium, for example a DVD. It includes one or more software code sections through the use of which all of the steps of a method including features or feature combinations in accordance with the instant application are executed when the product runs on a computer.

Due to the use of the method according to the invention including the features and feature combinations described in the instant application, there is furthermore provided a method for producing a lenticular image on a printing material, in particular by printing technology. According to the invention, in order to produce a lenticular image, the color separations calculated according to a method, including features or feature combinations in accordance with the instant application, are in each case exposed onto a printing form, in particular a printing plate, and the exposed printing forms, in particular printing plates, are printed onto a printing material in combination printing in a printing machine, in such a way that a multicolored lenticular image arises on the printing material.

The lenticular image can be part of a larger printing subject. The printing machine can, in particular, be a packaging printing machine or a label printing machine. In particular, the printing methods offset printing, intaglio printing, flexographic printing, letterpress printing or screen printing can be employed in each case individually or in combination.

In an additional step in the method according to the invention for producing a lenticular image, there can be applied to the printed lenticular image a lens film with a sequence of lenses having a lenticular frequency in the same orientation as the lenticular image.

The printing material can, in particular, be paper, paperboard, cardboard, organic polymer film or aluminum film.

Other features which are considered as characteristic for the invention are set forth in the appended claims.

Although the invention is illustrated and described herein as embodied in a method for screening color separations of a lenticular image, a computer program product and a method for producing a lenticular image on a printing material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
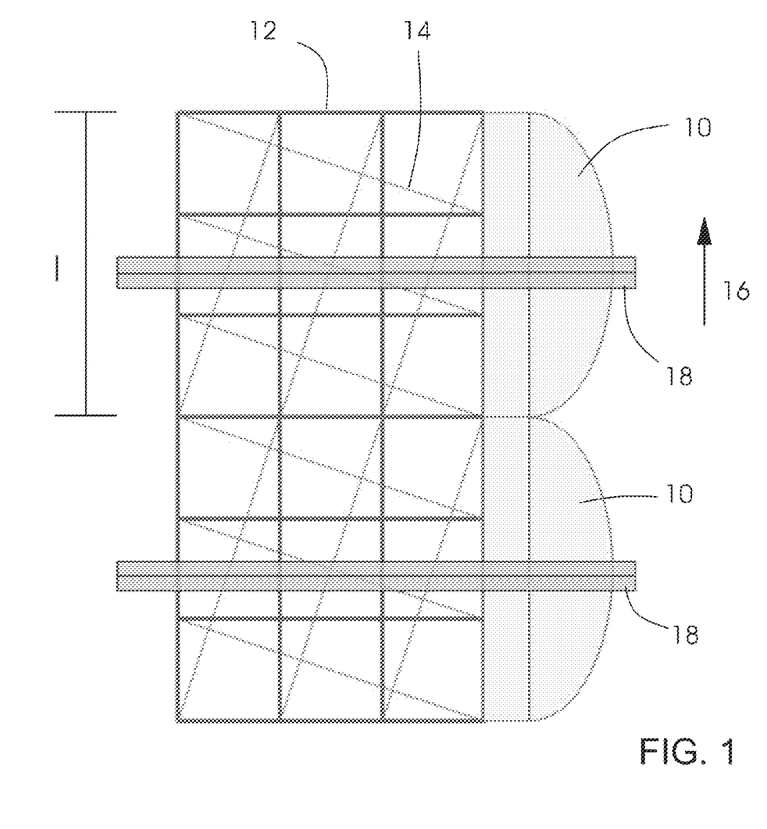
FIG. 1 is a diagrammatic illustration of two lenticular lenses with an exemplary screen lying underneath.

Referring now to the figures of the drawings in detail and first, particularly, to FIG. 1 thereof, there is seen a diagrammatic illustration of two lenticular lenses 10 having a lens width l, with two underlying exemplary screens 12, 14 of a lenticular image. The first screen 12 is oriented in a direction 16 of the lens periodicity, and the second screen 14 has an angle of approximately 18.4349 degrees (tangent of the angle equals ⅓) with respect to the direction 16. This illustration reveals, in particular, the periodicity of the two screens 12, 14 in a direction perpendicular to the direction 16 of the lens periodicity. Due to the imaging of the lenticular image by the lenticular lenses 10, only image excerpts 18 are visible to the observer.

Figure 2:
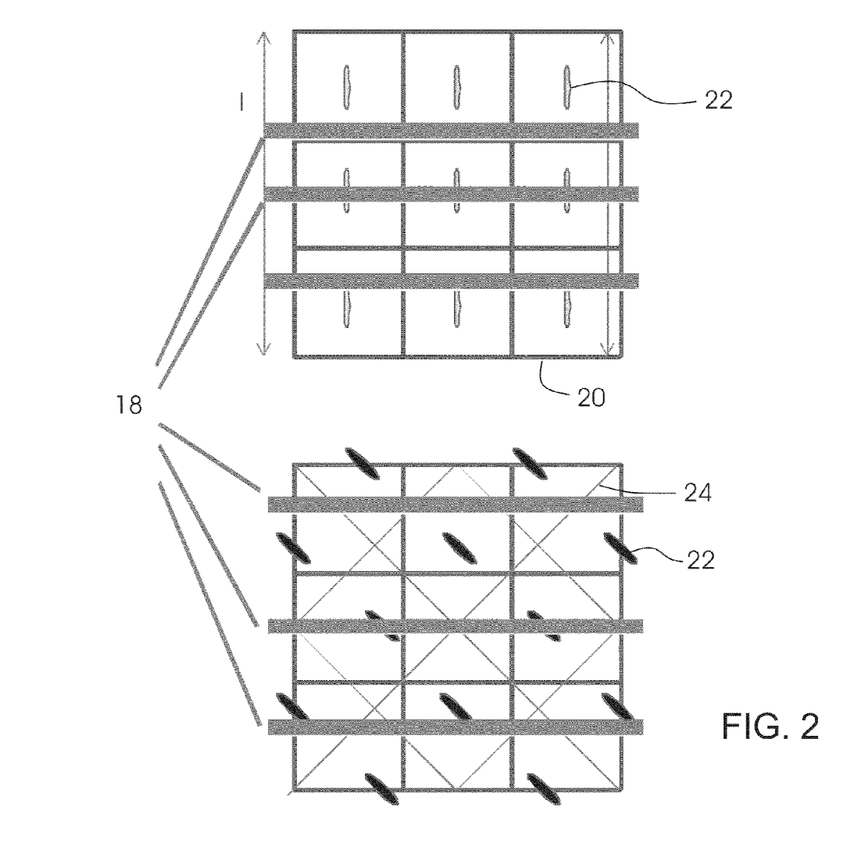
FIG. 2 is a diagrammatic illustration for explaining a viewing angle dependence of orthogonal screens.

FIG. 2 is a diagrammatic illustration for explaining a viewing angle dependence of orthogonal screens of two color separations in multicolor printing. In a first orthogonal screen 20 having elliptical halftone dots 22 for a first color separation, the different image excerpts 18 are visible at different viewing angles, while in a second orthogonal screen 24 having elliptical halftone dots 22 for a second color separation, a respective one of the different image excerpts 18 is visible at one of the viewing angles. In this case, in an undesirable manner, less or more color is visible depending on the viewing angle, that is to say in different image excerpts 18, with the result that a corrupted visual color impression arises for the observer.

Figure 3:
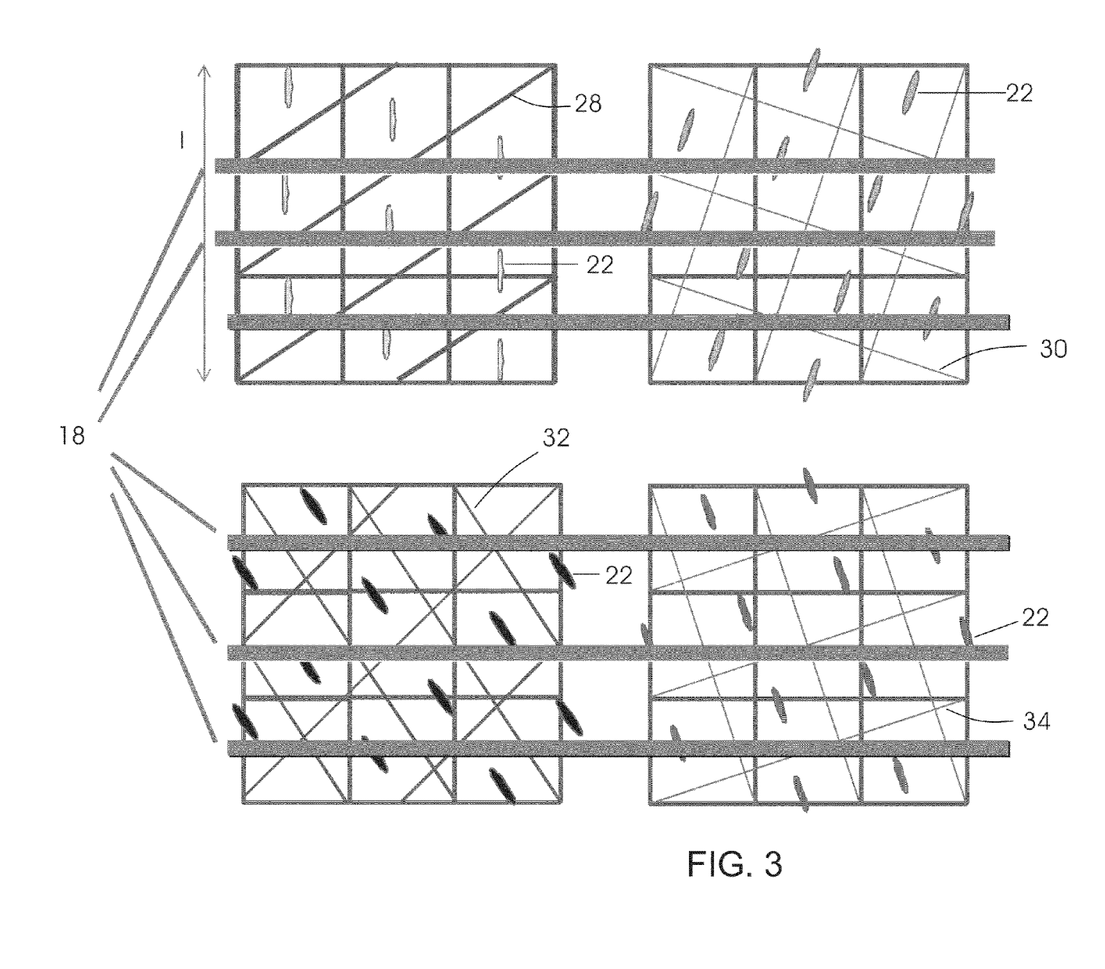
FIG. 3 is a diagrammatic illustration for explaining an avoidance of viewing angle dependence by using non-orthogonal screens for color separations at screen angles of 0 degrees and 45 degrees.

The diagrammatic illustration in FIG. 3 serves for explaining the avoidance of viewing angle dependence in four-color printing by using non-orthogonal screens for the color separations at screen angles of 0 degrees and 45 degrees. A first color, for example yellow (y), is printed in a first non-orthogonal screen 28 having elliptical halftone dots 22 at the screen angle of 0 degrees. A second color, for example cyan (c), is printed in a third orthogonal screen 30 having elliptical halftone dots 22. A third color, for example black (b), is printed in a second non-orthogonal screen 32 having elliptical halftone dots 22 at a screen angle of 45 degrees. A fourth color, for example magenta (m), is printed in a fourth orthogonal screen 34 having elliptical halftone dots 22. If visible image excerpts 18 are then observed at different viewing angles with the lenticular lens, approximately a color area of identical size, an area coverage proportion of identical magnitude, is always visible.

Figure 4:
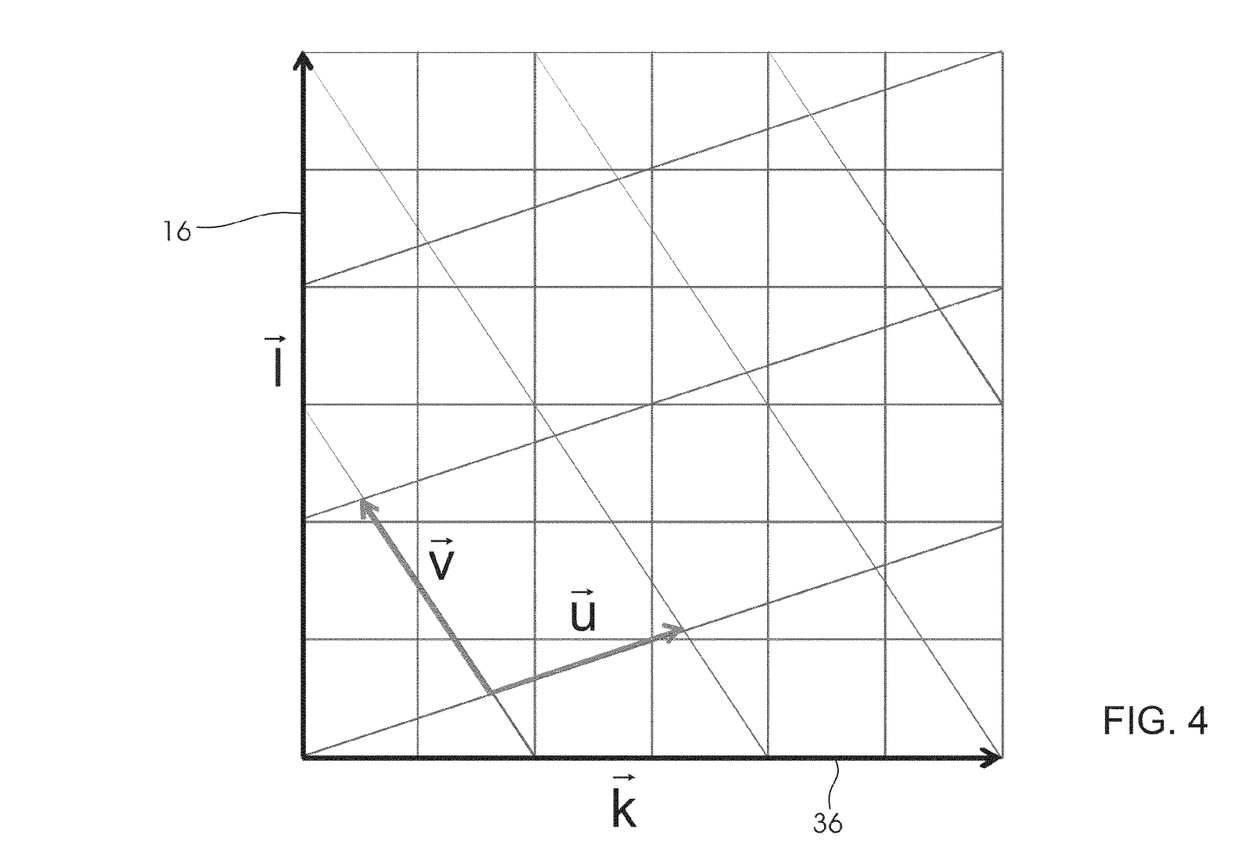
FIG. 4 is a diagrammatic illustration for explaining defined vectors and distances.

FIG. 4 is a graphical illustration for explaining the defined vectors and distances. Linearly independent, non-orthogonal vectors u and v describe a screen cell of the screen. In the illustration in FIG. 4, they are neither parallel nor orthogonal to the vector of the absolute value of the lens width l, which proceeds perpendicularly to the lenticular lenses in the direction of the lens periodicity. In general, however, one of the vectors can be parallel or orthogonal to the vector of the absolute value of the lens width l. Furthermore, a vector perpendicular to that vector is defined, that is to say in the direction of the lenticular lenses with the absolute value of a distance k. The x-components of the vectors u and v are projections onto the direction defined by the vector with the absolute value k, and the y-components of the vectors u and v are projections onto the direction defined by the vector with the absolute value l.

Figure 5:
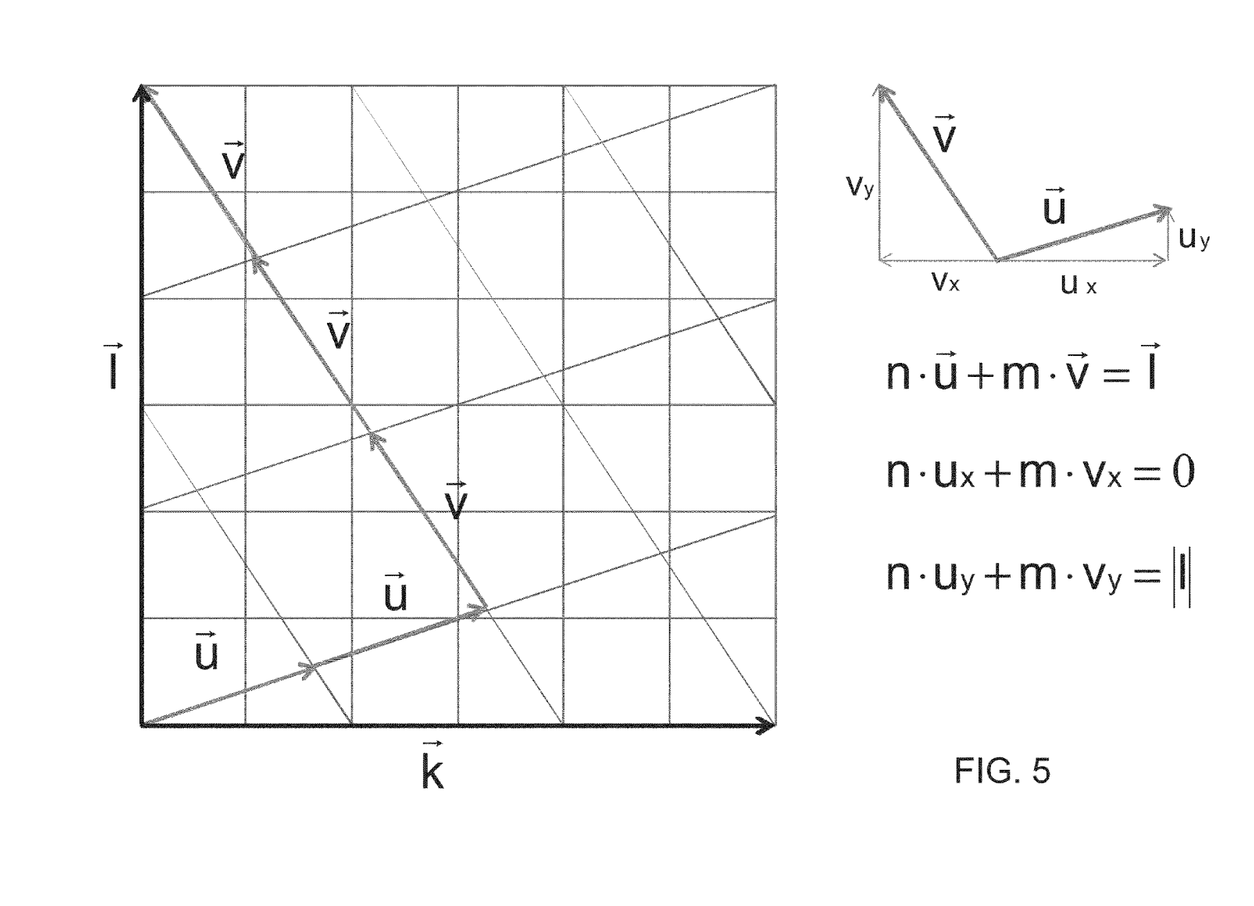
FIG. 5 is a diagrammatic illustration for explaining a first condition for screens according to the invention for lenticular printing.
Figure 6:
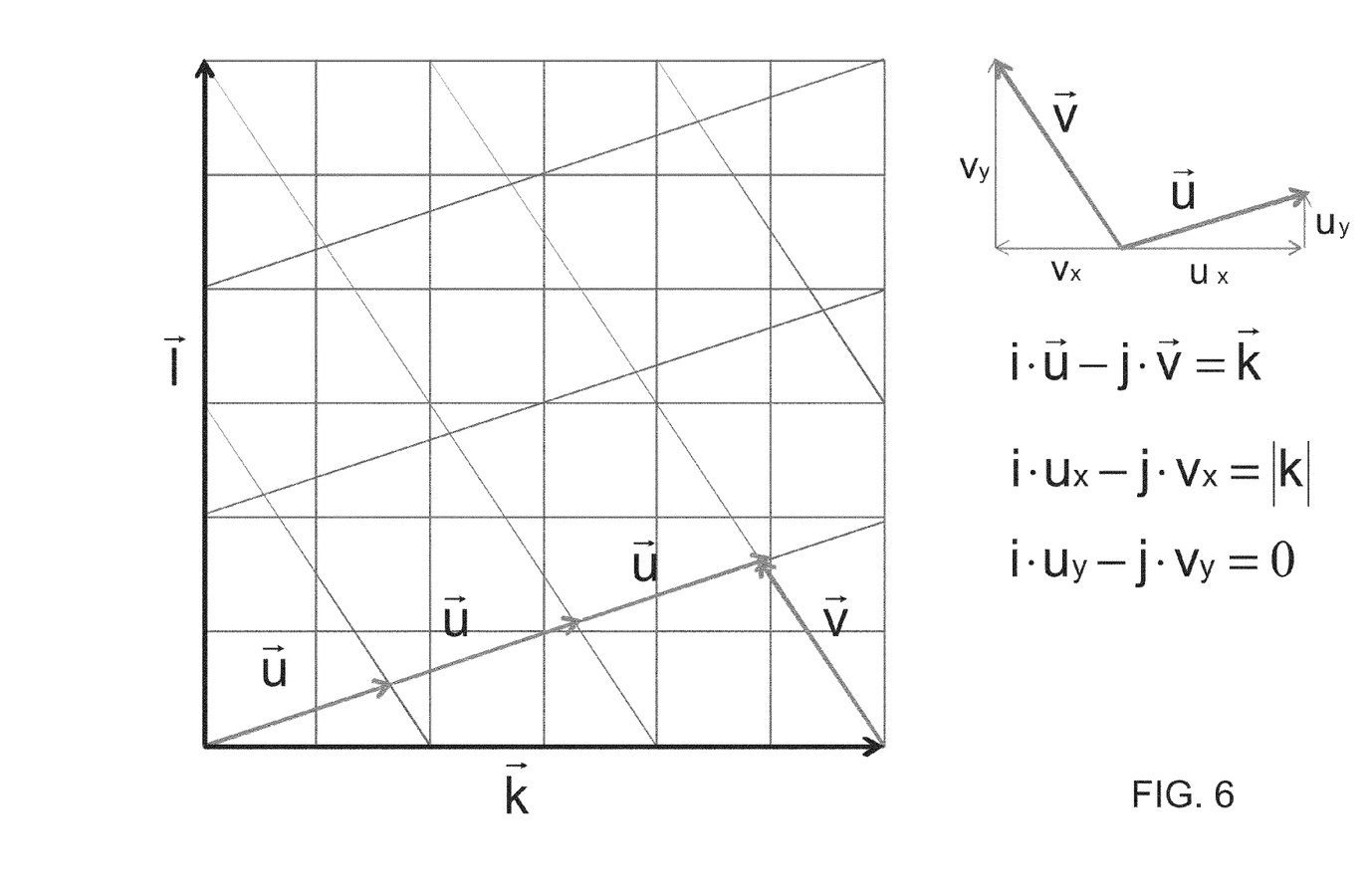
FIG. 6 is a diagrammatic illustration for explaining a second condition for screens according to the invention for lenticular printing.

FIG. 5 is a graphical illustration for explaining a first condition for screens according to the invention for lenticular printing and FIG. 6 is a graphical illustration for explaining a second condition for screens according to the invention for lenticular printing. These graphical illustrations can be considered jointly: therefore, according to the invention, a supercell is formed from a plurality of screen cells in such a way that the vectors u and v spanning the screen in a linear combination with integral coefficients n and m produce the vector in the direction perpendicular to the lenticular lenses with the absolute value l. At the same time, it holds true for the vectors u and v spanning the screen that they, in a linear combination with integral coefficients i and −j, produce the vector in the direction parallel to the lenticular lenses with the absolute value k. Preferably, the absolute value k is equal to the absolute value l.

Figure 7:
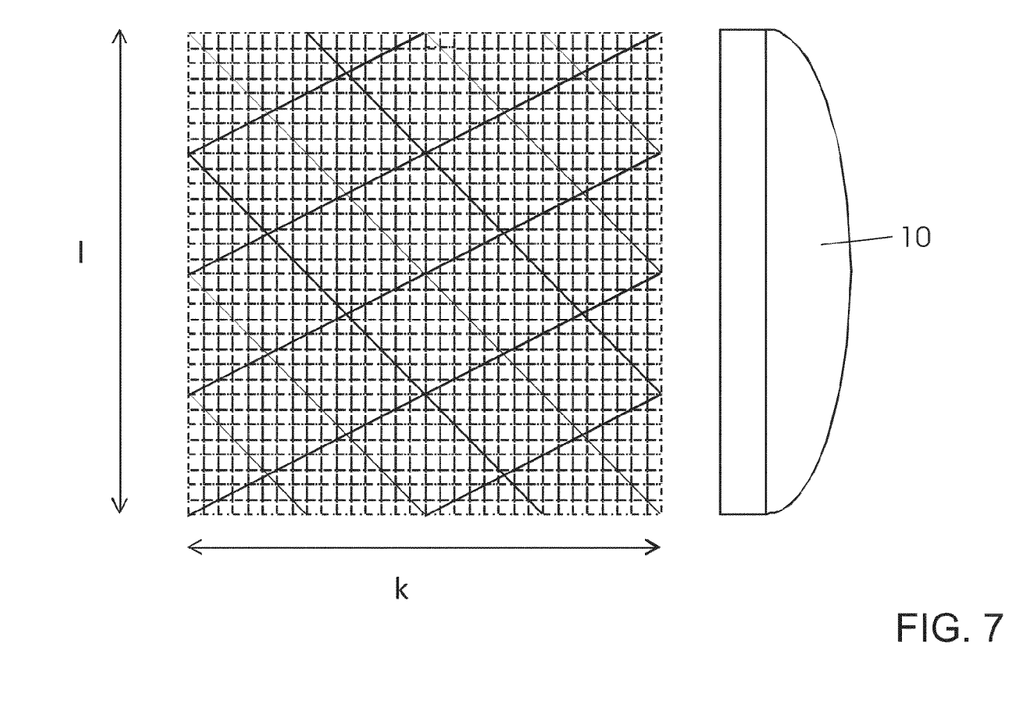
FIG. 7 is a diagrammatic illustration of an example of a lens width of 32 exposure device pixels.

FIG. 7 shows a concrete example of a lens width of 32 exposure device pixels under a lenticular lens 10. In this numerical example, in units of exposure device pixels, l=32 and k=32. With the first pair of integers (4, 4) and the second pair of integers (4, 2), the following arises for the individual components of the vectors u and v: $u_x=16/3$, $u_y=8/3$, $v_x=-16/3$ and $v_y=16/3$.

With regard to the choice of suitable pairs of numbers and the vectors, besides the fact that they are intended not to be identical for different color separations, the fact that the long axis of elliptical halftone dots lies in a range around ±45 degrees relative to the perpendicular to the lens direction is preferably taken into account in such a way that the viewing angle dependence is advantageously reduced, and/or that the area of the halftone dots is approximately identical in all of the screens. As is usually the case for screens, the choice is generally subjected to a visual assessment in order to distinguish preferred from less preferred parameters.

Figure 8:
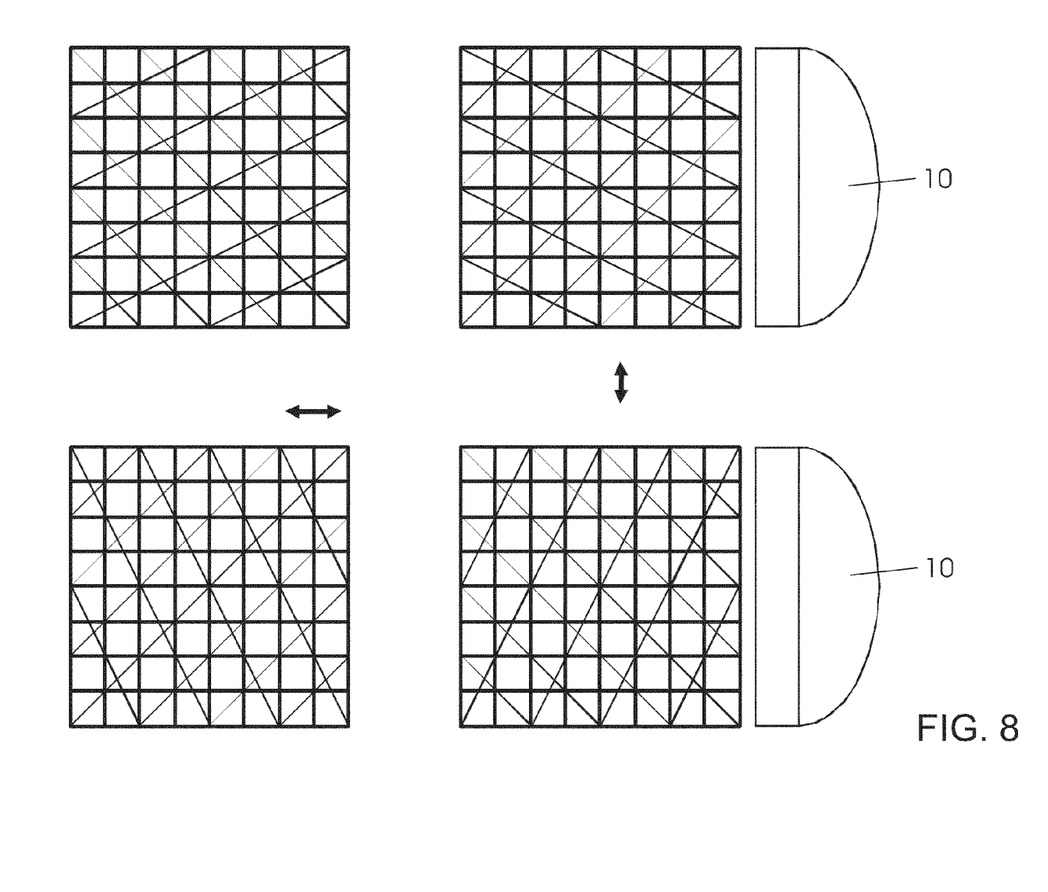
FIG. 8 is a diagrammatic illustration of an example of possibilities for extending a choice of non-orthogonal screens.

FIG. 8 diagrammatically relates to an example of possibilities for extending the choice of non-orthogonal screens by mirroring or by rotation. From a predetermined non-orthogonal screen, three further non-orthogonal screens can be obtained through the use of these operations. While orthogonal screens, in the case of a rotation by 90 degrees, change only if the halftone dot shape has an orientation, for example in the case of elliptical halftone dots or in line screens, the choice of possibilities for non-orthogonal screens are significantly extended.

Figure 9:
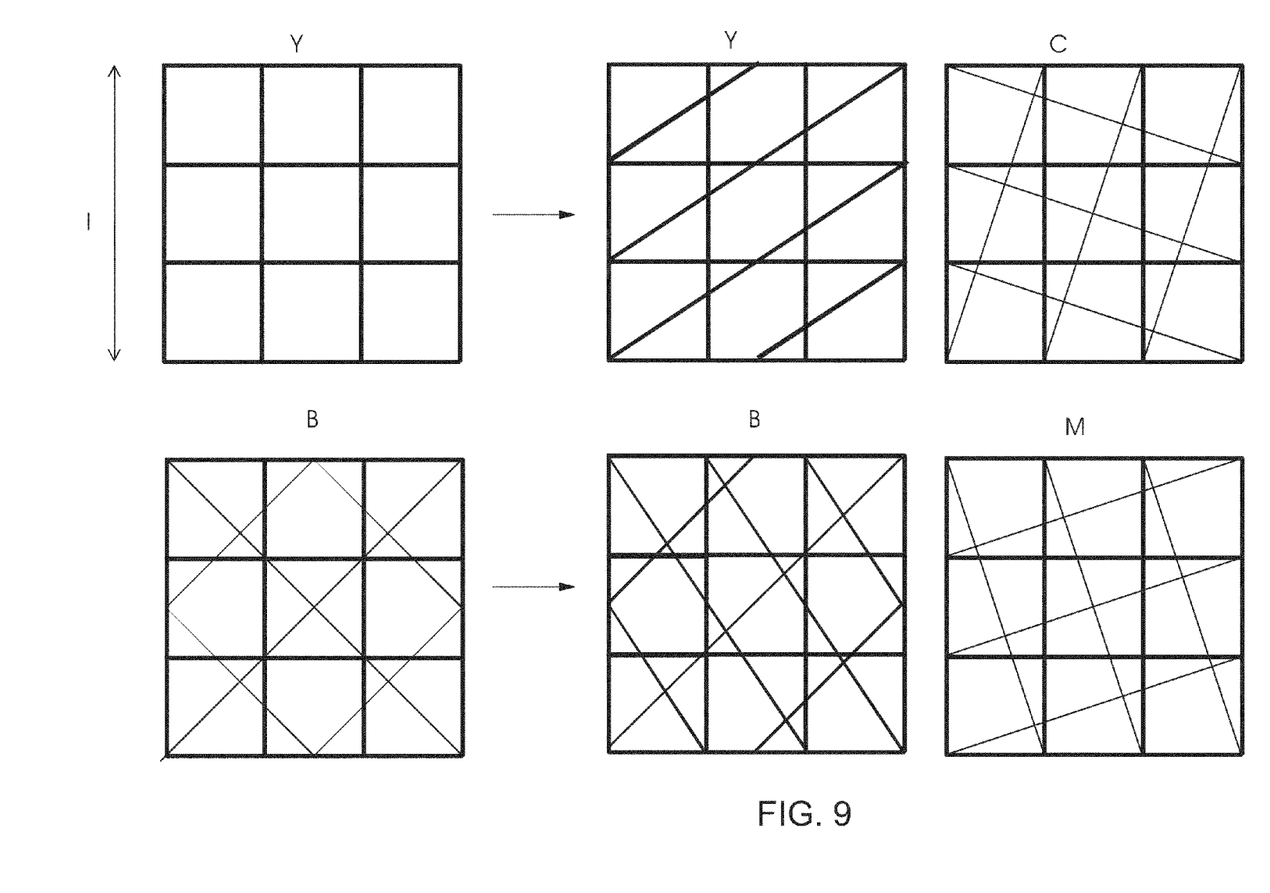
FIG. 9 is a diagrammatic illustration for explaining a preferred exemplary embodiment of a screen according to the invention for four-color printing.

FIG. 9 is a diagrammatic illustration for explaining a preferred exemplary embodiment of a screen according to the invention for four-color printing. In this example, instead of orthogonal screens—depicted diagrammatically on the left-hand side—non-orthogonal screens—depicted diagrammatically in the center—are used for the color separations at 0 degrees (color y) and at 45 degrees (color b), while the color separations at approximately −18.4 degrees (color c) and at approximately 18.4 degrees (color m) are printed in an orthogonal screen—shown on the right-hand side. The following numerical parameters for the lens width l and the distance k are used in this preferred embodiment:

For the color Y: (n, m)=(3,0); (i, j)=(4.5,3); $u_x=k/3$, $u_y=1/4.5$, $v_x=0$ and $v_y=1/3$.

For the color C: (n, m)=(3,1); (i, j)=(1, 3); $u_x=k/10$, $u_y=1/(10/3)$, $v_x=-k/(10/3)$ and $v_y=1/10$.

For the color B: (n, m)=(2, 2); (i, j)=(3, 2); $u_x=k/5$, $u_y=1/5$, $v_x=-k/5$ and $v_y=1/(10/3)$.

For the color M: (n, m)=(1, 3); (i, j)=(3, 1); $u_x=k/(10/3)$, $u_y=1/10$, $v_x=-1/10$ and $v_y=1/(10/3)$.

The invention claimed is:

1. A method for screening color separations of a lenticular image having a lenticular frequency of lenticular lenses required for viewing the lenticular image and having a lens width l, the method comprising the following steps:
   calculating an amplitude-modulated halftone image for each color separation at least at one screen angle having a tangent being a rational number and with at least one screen frequency;
   providing a screen with non-orthogonal screen cells spanned by vectors u and v for at least one specific color separation of the color separations;
   defining a distance k;

defining directions of the vectors u and v relating to a perpendicular direction with respect to image strips of the lenticular image for the specific color separation;

defining a first pair of rational numbers (n, m);

defining a second pair of rational numbers (i, j); and satisfying a system of equations:

$$n*u_x+m*v_x=0,\ n*u_y+m*v_y=1,\ i*u_x-j*v_x=k\ \text{and}\ i*u_y-j*v_y=0$$

for vectors $u=(u_x, u_y)$ and $v=(v_x, v_y)$ spanning the screen cells.

2. The method for screening color separations of a lenticular image according to claim 1, wherein at least one of the numbers n, m, i and j is an integer.

3. The method for screening color separations of a lenticular image according to claim 1, wherein the screen angles for a respective two of the color separations are different from one another.

4. The method for screening color separations of a lenticular image according to claim 1, which further comprises choosing the at least one screen angle for a specific color separation from a group of screen angles being optimized for minimizing Moiré effects in screenings.

5. The method for screening color separations of a lenticular image according to claim 1, wherein the distance k is substantially equal to the lens width l.

6. The method for screening color separations of a lenticular image according to claim 1, which further comprises selecting the at least one screen angle from the group consisting of 0 degrees, 45 degrees, approximately 18.435 degrees (tangent equals ⅓) and approximately 161.565 degrees (tangent equals −⅓).

7. The method for screening color separations of a lenticular image according to claim 1, which further comprises selecting the at least one screen angle from the group consisting of approximately 33.69 degrees (tangent equals ⅔), approximately 146.31 degrees (tangent equals −⅔), approximately 18.435 degrees (tangent equals ⅓) and approximately 161.565 degrees (tangent equals −⅓).

8. The method for screening color separations of a lenticular image according to claim 1, which further comprises calculating four halftone images of four color separations for four-color printing in cyan, magenta, yellow and black.

9. The method for screening color separations of a lenticular image according to claim 1, wherein the halftone dot has an asymmetrical shape.

10. The method for screening color separations of a lenticular image according to claim 9, wherein, in a specific color separation, the halftone dots grow in direction of a longer vector of the vectors u and v or in direction of a shorter vector of the vectors u and v.

11. The method for screening color separations of a lenticular image according to claim 9, wherein, in a specific color separation, the halftone dots grow in direction of a longer diagonal of the screen cell or in direction of a shorter diagonal of the screen cell.

12. The method for screening color separations of a lenticular image according to claim 1, wherein the halftone dot has an elliptical or linear shape.

13. The method for screening color separations of a lenticular image according to claim 1, which further comprises:

selecting one of two screen angles for the specific color separation as 0 degrees or 45 degrees;

determining a third pair of integers (p, q) for a further color separation, with a quotient (q/p) of the integers being equal to the tangent of a screen angle of the further color separation; and calculating a screen frequency of the further color separation as a product of the lenticular frequency and the square root of the sum of the squares of the two integers p and q.

14. The method for screening color separations of a lenticular image according to claim 8, which further comprises:

selecting one of two screen angles for the specific color separation as 0 degrees or 45 degrees;

determining a third pair of integers (p, q) for a further color separation, with a quotient (q/p) of the integers being equal to the tangent of a screen angle of the further color separation; and calculating a screen frequency of the further color separation as a product of the lenticular frequency and the square root of the sum of the squares of the two integers p and q.

15. The method for screening color separations of a lenticular image according to claim 13, which further comprises selecting the screen angle of the further color separation as approximately 18.435 degrees (tangent equals ⅓) or approximately 161.565 degrees (tangent equals −⅓).

16. The method for screening color separations of a lenticular image according to claim 14, which further comprises selecting the screen angle of the further color separation as approximately 18.435 degrees (tangent equals ⅓) or approximately 161.565 degrees (tangent equals −⅓).

17. The method for screening color separations of a lenticular image according to claim 1, wherein the lenticular frequency is between 5 and 150 lpi (lines per inch).

18. A Non-Transitory internal memory of a digital computer loaded with a computer program and stored on a computer-suitable medium and including software code sections executable by a computer processor to perform all of the method steps of screening color separations of a lenticular image having a lenticular frequency of lenticular lenses required for viewing the lenticular image and having a lens width l, the method comprising the following steps:

calculating an amplitude-modulated halftone image for each color separation at least at one screen angle having a tangent being a rational number and with at least one screen frequency;

providing a screen with non-orthogonal screen cells spanned by vectors u and v for at least one specific color separation of the color separations;

defining a distance k;

defining directions of the vectors u and v relating to a perpendicular direction with respect to image strips of the lenticular image for the specific color separation;

defining a first pair of rational numbers (n, m);

defining a second pair of rational numbers (i, j); and satisfying a system of equations:

$$n*Ux+m*Vx=0,\ n*Uy+m*Vy=1,\ i*ux-j*Vx=k\ \text{and}\ i*uy-j*Vy=0$$

for vectors $u=(Ux, Uy)$ and $v=(Vx, Vy)$ spanning the screen cells.

19. A method for producing a lenticular image on a printing material, the method comprising the following steps:

exposing each of the color separations calculated according to the method steps of screening color separations of a lenticular image having a lenticular frequency of lenticular lenses required for viewing the lenticular image and having a lens width l, the method comprising the following steps:

calculating an amplitude-modulated halftone image for each color separation at least at one screen angle having a tangent being a rational number and with at least one screen frequency;

providing a screen with non-orthogonal screen cells spanned by vectors u and v for at least one specific color separation of the color separations;

defining a distance k;

defining directions of the vectors u and v relating to a perpendicular direction with respect to image strips of the lenticular image for the specific color separation;

defining a first pair of rational numbers (n, m);

defining a second pair of rational numbers (i, j); and satisfying a system of equations:

$n*Ux + m*Vx = 0$, $n*Uy + m*Vy = 1$, $i*ux - j*Vx = k$ and $i*uy - j*Vy = 0$ for vectors $u = (Ux, Uy)$ and $v = (Vx, Vy)$ spanning the screen cells.

wherein the image strips of the lenticular image is printed onto a printing form;

and printing the exposed printing forms onto a printing material in combination printing in a printing machine, to create a multicolored lenticular image on the printing material.

20. The method for producing a lenticular image according to claim 19, which further comprises applying to the printed lenticular image a lens film with a sequence of lenses having the lenticular frequency in the same orientation as the lenticular image.

* * * * *